J. H. WINTERS.
HOG FEEDER.
APPLICATION FILED JUNE 5, 1919.
1,340,096.
Patented May 11, 1920.
2 SHEETS—SHEET 2.
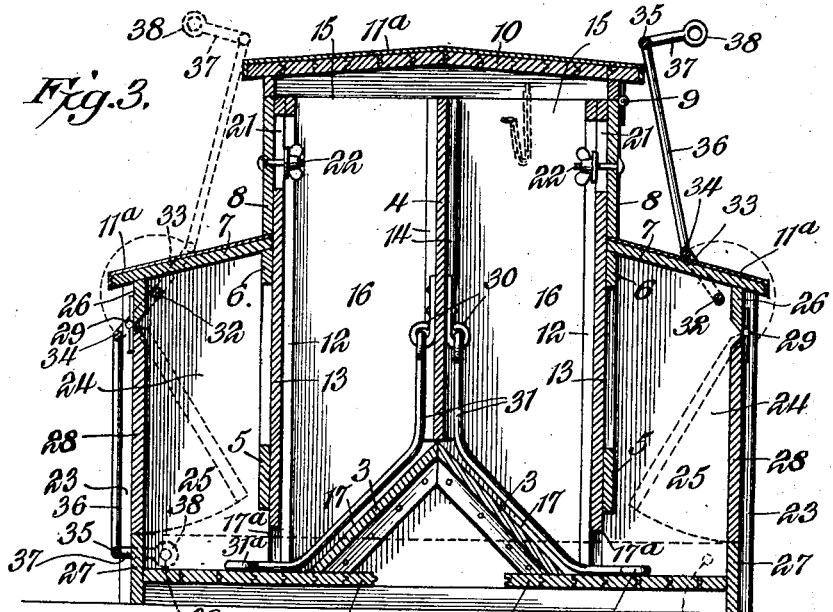
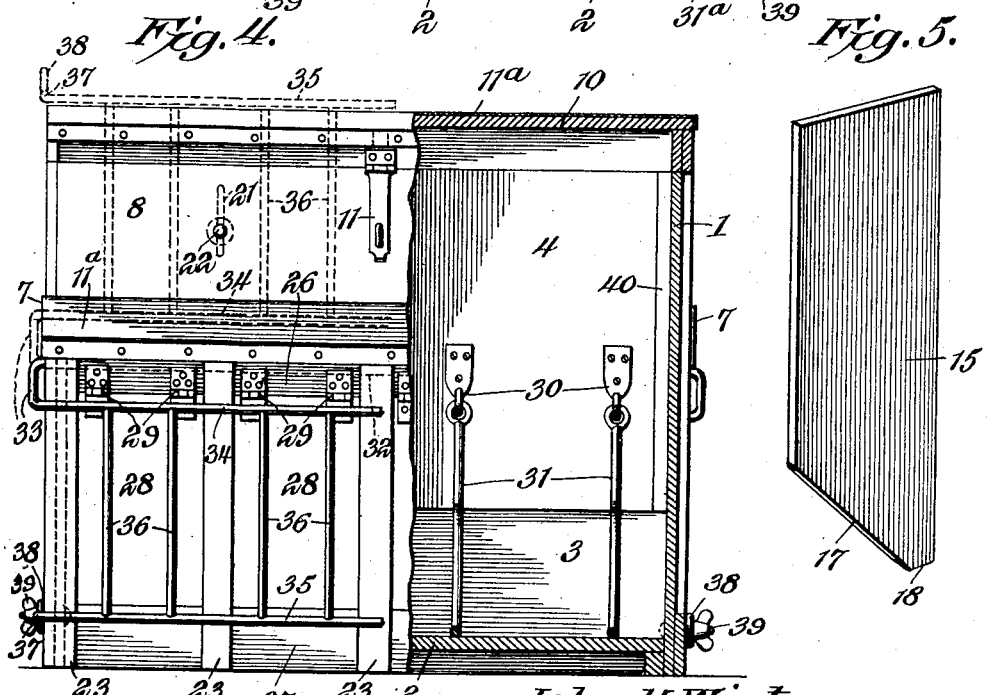
WITNESSES
Howard D. Orr.
F. T. Chapman.
John H. Winters, INVENTOR,
BY E. G. Siggers
J. H. Siggers
ATTORNEYS

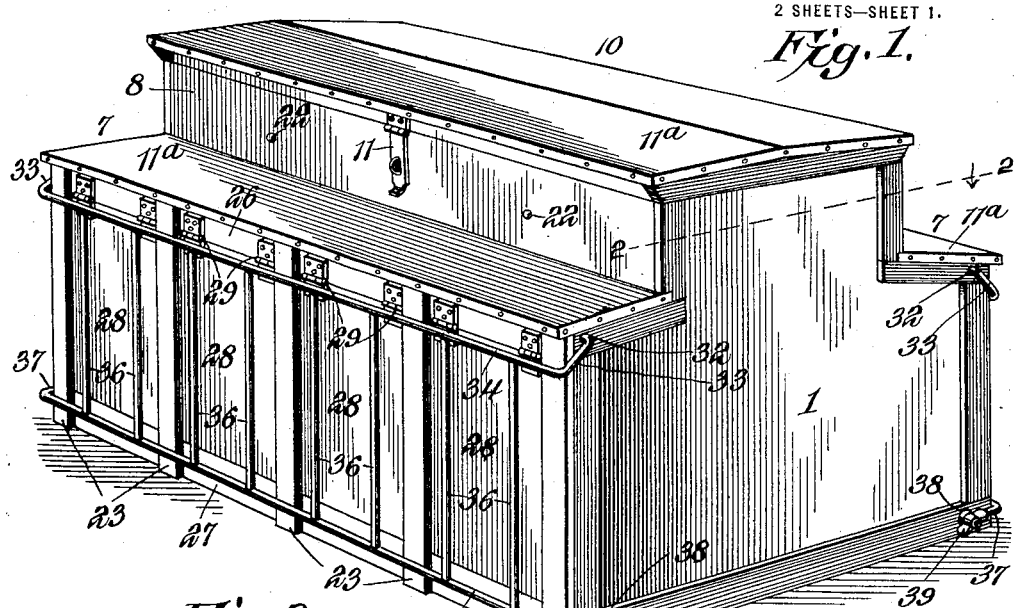
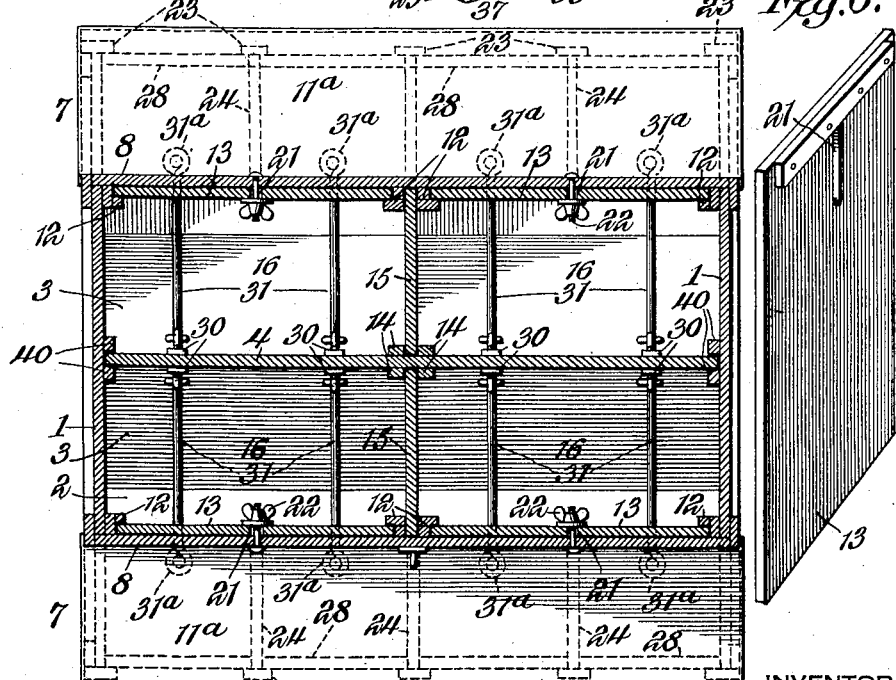

UNITED STATES PATENT OFFICE.

JOHN H. WINTERS, OF ADAMS, TENNESSEE.

HOG-FEEDER.

1,340,096.   Specification of Letters Patent.   Patented May 11, 1920.

Application filed June 5, 1919. Serial No. 301,982.

*To all whom it may concern:*

Be it known that I, JOHN H. WINTERS, a citizen of the United States, residing at Adams, in the county of Robertson and State of Tennessee, have invented certain new and useful Improvements in Hog-Feeders, of which the following is a specification.

This invention has reference to hog feeders, and its object is to provide a receptacle for feed wherein the feed is kept from waste or contamination, or access of other creatures, and yet is readily accessible to hogs or pigs.

In accordance with the invention the receptacle is in the form of an inclosure containing one or more compartments each with a pendent door and with a suitable number of hoppers to contain feed either of the same or different characteristics. The hopper is arranged to carry the feed in a manner whereby it will gravitate to a position where it may be reached by the animal and the mouth of the hopper is constructed to permit adjustment of the outlet to regulate the outflow in accordance with the character of the feed. There is also provided a grating which may be moved in front of or removed from the opening closed by the gravitation of the door or doors to pendent position, so that when the grating is in place hogs cannot reach the food but small pigs find ready access thereto, thus preventing the hogs from interfering with the feeding of the smaller animals.

Provision is made for agitating the food in the hoppers thereby preventing choking and insuring a supply of food within reach of the animals so long as any food remains in the hoppers. There are various other features of the invention which will be made evident hereinafter.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:—

Figure 1 is a perspective view of a multiple-hopper feeder.

Fig. 2 is a section on the line 2—2 of Fig. 1.

Fig. 3 is a vertical cross section.

Fig. 4 is a side elevation, with some parts broken away.

Fig. 5 is a perspective view of a partition board for dividing the interior of the device into hoppers.

Fig. 6 is a perspective view of a slide whereby the size of the mouth of the hopper may be varied.

Referring to the drawings, there is shown a structure composed of end members 1 and a bottom or floor 2 which may be incomplete crosswise of the structure to save lumber. Rising from the floor and extending between the side members are inclined bottom pieces 3 meeting at the upper ends in the longitudinal upright mid-plane of the structure. Rising from the top edge of the slanting bottom pieces 3 is a lengthwise partition 4. Extending between the side members 1 are cleats 5, 6, with the cleats 6 spaced above the cleats 5 and secured to the end members 1. Also extending between the end members 1 are outstanding slanting roof boards 7, these being arranged on opposite sides of the structure. The inner end of each roof member 7 is higher than the outer end thereof so that the roof slants away from the main part of the structure, which latter is carried higher than the roof members 7, and the higher portion of the main structure has upstanding sides 8 rising as high as the partition 4 and the tops of the ends 1.

Secured by hinges 9 to one of the upstanding sides 8 is a cover 10 constituting the roof of the structure, a hasp 11 being secured to the other side of the roof structure 10, whereby the cover or roof 10 may be closed onto the upstanding portion of the structure and there locked, if desired.

The roof structure may be of single or double pitch in accordance with the size of the structure and both the roof structure 10 and the roof members 7 may be provided with a sheathing 11$^a$ of metal or other suitable material to protect the structure from the effects of weather.

Fast to the cleats 5 and 6 and to the ends 1 are upright guide strips 12 defining channels for the reception of gate or damper boards 13 while other upright guide strips 14 on the partition 4 match certain of the guides 12 to receive other partitions 15 which may be arranged between the ends 1 and serve to divide the spaces between the ends 1 and sides of the main body of the structure into a series of compartments 16, of which four are shown in the particular example illustrated in the drawings. The partitions 15, of which one is shown separately in Fig. 5, each have a bottom slanting edge 17 merging into a straight edge 18 so that the bottom of the partition may conform to the slanting boards 3 and a portion of the floor 2 extending therebeyond. In this manner the interior of the main body of the structure is divided into a number of compartments or hoppers 16, each with a slanting bottom having the inclination of the hopper bottoms on opposite sides of the upright lengthwise mid-plane of the body divergent.

The mouth of each hopper is defined by the space between the corresponding end 1 and partition 15 and the space between the bottom edge of the cleat 5 and the bottom 2 of the structure. With such an arrangement, if feed be placed in any one of the compartments 16, it will naturally gravitate toward the lower outer corner of the hopper to pass through the mouth thereof, indicated at $17^a$ in Fig. 3. However, it is advisable to vary the size of the outlet or mouth of the hopper, wherefore each compartment 16 contains one of the slides 13 guided between the upright strips 12, carried by the cleats 5 and 6 and outer side boards 8 of the main body of the structure above the roofs 7. The gates or slides 13 are so arranged that by sliding them up or down the effective size of each mouth $17^a$ may be varied. In order to hold each gate or slide 13 in the adjusted position it is provided with a longitudinal slot 21 traversed by a wing bolt 22 whereby the adjustment of the gate or slide is facilitated. These wing bolts need adjustment but occasionally and are readily accessible on lifting the roof or cover 10.

Supporting each roof 7 are a number of posts 23 between which and the cleats 5 and 6 are located a corresponding number of partitions 24 dividing the outstanding portions of the structure covered by each roof 7 into a number of chambers or compartments 25. On each side of the structure the posts or uprights 23 are joined at the top beneath a corresponding portion of the respective roof 7 by a longitudinal strip 26 and at the bottom by a similar strip 27 rising above the floor 2 within each compartment 25 so food is not readily thrown out from the latter by the animal. The space between the posts 23 and the strips 26 and 27 of each compartment 25 is normally closed by a door 28 hung at the upper edge to the strip 26 by hinges 29, so that the door is pendently hung and tends to normally assume a position closing access to a corresponding compartment 25 but readily yieldable to a force tending to move the door inwardly to a position similar to that shown in dotted lines in Fig. 3.

Hung from an eye bracket 30 in each compartment 16 is an agitator rod 31 bent into conformity to the general shape of the lower end of the hopper 16, that is, the ends of the rod being approximately at right angles to each other and the intermediate portion of the rod being bent at about 135° to the ends. Each rod 31 is long enough to project through the opening $17^a$ into the corresponding compartment 25 and is there formed into an eye $31^a$, or may be otherwise formed, and is designed to serve as an agitator, being so arranged as to be readily moved by the snout of the animal.

Extending lengthwise through the series of compartments or chambers 25 on opposite sides of the hoppers is a rod or rock shaft 32 carrying at the ends, by means of crank arms 33, another rod 34 which may be in parallel relation to the shaft 32. Spaced from the rod 34 is another rod 35 which may be in parallel relation to the rod 34 and connected thereto by a suitable number of cross rods 36 so that the rods 34, 35 and 36 provide a grating and the rods 36 are so situated as to restrict access to the doors 28 and through the latter to the compartments 25. Each end of each rod 35 has an angle extension 37 terminating in an eye 38 so situated that the eye 38 may be in turn traversed by a wing bolt 39 whereby the grating may be secured in place in covering relation to the doors 28. When it is desired to move the grating away from the doors 28 the wing bolts 39 are removed and the grating is swung up over the roofs 7 out of the way, such position being indicated in solid and dotted lines on the right and left hand sides of Fig. 3.

With the particular structure shown in the drawings, that is a structure containing four hoppers 16 and two feeding compartments 24 for each hopper, eight hogs or pigs may be accommodated, or four hogs and four pigs may feed at the same time, the grating, when lowered, preventing hogs from feeding at those compartments 25 where the doors 28 are protected by the grating.

The feeding structure permits the use of different kinds of feed for hogs or pigs and in the four-hopper type shown in the drawings, four different varieties of feed may be provided at the same time. In order to obtain the food which readily gravitates from a hopper into a corresponding compartment 25 through the feed opening $17^a$, the hog or pig, as the case may be, easily forces the door 28 open with its snout and can readily reach the grain or other food flowing through the opening $17^a$, such grain being constantly replenished, as consumed, from the supply within the corresponding hopper. Should the food not flow readily the effort of the animal to reach more food causes movements of the agitator 31, thereby freeing the food which then readily flows into easy reach of the animal. When feeding, the animals cannot see each other, being hidden by the partitions 24.

It is, at times, desirable to feed the hogs corn on the cob, and such food, being of a bulky nature, is liable to jam in the hoppers. To avoid this the partitions 15 are readily removed and if greater space be needed the partition 4 may be lifted out of the main body of the structure, since the ends of the partition 4 slide between guiding strips 40 on the inner faces of the ends 1 of the structure. When the partitions 4 and 15 are removed a single hopper or container is provided with a hip bottom due to the bottom portions 3 of the structure rising and meeting in a peak. In this way large material, like corn on the cob, may be readily filled into the container or enlarged hopper and will easily find its way to the openings 17 for passage into the compartments 25.

The slides or gates 13 also serve as agitators since on loosening the wing bolts 22 these gates may be moved up and down, thus breaking any jam which may occur at the openings 17ª. The wing bolts are easily reached on lifting the cover 10 and to facilitate the operation of the gates or slides 13, each slide is provided with a cleat best seen in Fig. 6 serving as a finger-hold.

A hog or pig quickly learns to operate the structure for feeding purposes even though the doors 28 be all closed. In the effort to reach the food the hog will push against a door 28, thus opening it. If the grating comprising the rods 36 be in covering relation to the door 28, the hog will be unable to push to a sufficient extent into the compartment 25 closed by the door and so will be unable to reach the food, but a pig will be able to easily reach the food. However, the pig cannot reach farther into the compartment 25 with the grating down than can a hog when the rods 36 are out of the way, because of the larger size of the head of the hog. For this reason no material wastage occurs in either case.

What is claimed is:—

1. In a hog feeder, the combination with a receptacle having compartments leading therefrom, each compartment having a door with a normal tendency to close but yieldable inwardly to give access to said compartments, of a grating comprising upper and lower rods connected by cross rods, means for pivotally connecting the upper rod to the top of the compartments on the outside thereof and above the doors so that the cross rods extend in front of and across the doors when the grating is in its lower position, and means for detachably securing the other rod to the bottom of the compartments on the outside thereof below the doors, the grating being so disposed that upon release of the lower rod, it may be swung up over the compartments and supported out of the way.

2. In a hog feeder, a feed receptacle, a series of compartments on either side of and communicating with the receptacle, a slanting bottom for the receptacle rising to a peak and delivering the feed into the compartments by gravity, a removable partition running longitudinally of the receptacle and resting on said peak, and a series of agitators secured to the partition and removable therewith.

3. In a hog feeder, a feed receptacle, feeding compartments communicating with the receptacle at the lower part thereof, said receptacle having a peaked bottom, a partition running the length of the receptacle, and a series of agitators secured to the partition, each of said agitators being individual to a feeding compartment and comprising a rod depending along the partition and across the peaked bottom and extending out of the receptacle into the corresponding compartment.

In testimony whereof I affix my signature.

JOHN H. WINTERS.